United States Patent
Kang et al.

(10) Patent No.: US 7,486,102 B2
(45) Date of Patent: Feb. 3, 2009

(54) METHOD AND APPARATUS FOR TESTING LIQUID CRYSTAL DISPLAY

(75) Inventors: Dong Woo Kang, Gumi-si (KR); Soung Yeoul Eom, Gumi-si (KR); Bong Chul Kim, Daegu-si (KR); Ki Soub Yang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 204 days.

(21) Appl. No.: 11/443,113

(22) Filed: May 31, 2006

(65) Prior Publication Data

US 2007/0046320 A1    Mar. 1, 2007

(30) Foreign Application Priority Data

Aug. 30, 2005    (KR) .............. 10-2005-0080040

(51) Int. Cl.
*G01R 31/00*    (2006.01)
(52) U.S. Cl. ..................................... 324/770
(58) Field of Classification Search ............. None
See application file for complete search history.

(56) References Cited

U.S. PATENT DOCUMENTS

| | | | | |
|---|---|---|---|---|
| 5,293,178 A * | 3/1994 | Kobayashi | ........ | 345/87 |
| 5,546,013 A * | 8/1996 | Ichioka et al. | ........ | 324/770 |
| 6,759,867 B2 * | 7/2004 | Sohn | ........ | 324/770 |

* cited by examiner

*Primary Examiner*—Vinh P Nguyen
(74) *Attorney, Agent, or Firm*—McKenna Long & Aldridge LLP

(57) ABSTRACT

An LCD test method and apparatus for reducing the number of channels of a probe unit is provided. An apparatus for testing a liquid crystal display including: a stage on which a liquid crystal panel is placed; a plurality of vertically divided blocks, wherein each of the vertically divided blocks include a plurality of adjacent data lines; a data probe unit that provides test pattern signals respectively to groups of at least two of the plurality of vertically divided blocks of the liquid crystal panel; a plurality of horizontally divided blocks, wherein each of the horizontally divided blocks include a plurality of adjacent gate lines; a gate probe unit that provides scanning signals respectively to the plurality of horizontally divided blocks of the liquid crystal panel; and a controller that provides test pattern signals to the data probe unit and provides scanning signals to the gate probe unit.

6 Claims, 16 Drawing Sheets 62 or 72

FIG. 6
Related Art

|     | DB1 | DB2 | DB3 | DB4 | DB5 | DB6 | DB7 | DB8 | DB9 | DB10 | DB11 | DB12 |
|-----|-----|-----|-----|-----|-----|-----|-----|-----|-----|------|------|------|
| GB1 |     |     |     |     |     |     |     |     |     |      |      |      |
| GB2 |     |     | ▓   | ▓   | ▓   | ▓   | ▓   | ▓   | ▓   | ▓    |      |      |
| GB3 |     |     | ▓   | ▓   | ▓   | ▓   | ▓   | ▓   | ▓   | ▓    |      |      |
| GB4 |     |     |     |     |     |     |     |     |     |      |      |      |

METHOD AND APPARATUS FOR TESTING LIQUID CRYSTAL DISPLAY

This application claims the benefit of the Korean Patent Application No. 2005-0080040, filed on Aug. 30, 2005, which is hereby incorporated by reference as if fully set forth herein.

BACKGROUND OF THE INVENTION

1. Field of the Invention

The present invention relates to a method and apparatus for testing a liquid crystal display, and more particularly, to a method and apparatus for testing a liquid crystal display that reduces the number of channels of a probe unit.

2. Discussion of the Related Art

Liquid crystal displays generally display images by controlling the light transmittance of liquid crystal cells according to video signals. An active matrix liquid crystal display, which includes switching elements formed respectively in liquid crystal cells, is suitable to display moving images. Thin film transistors (TFT) are typically used as the switching elements in the active matrix liquid crystal display.

FIG. 1 shows a schematic diagram of an LCD according to the related art.

As shown in FIG. 1, the related art LCD includes a liquid crystal panel 12, a data driver 20, a gate driver 30, and a timing controller 40. The liquid crystal panel 12 includes liquid crystal cells formed in areas defined by n gate lines GL1 to GLn and m data lines DL1 to DLm. The data driver 20 provides analog video signals to the data lines DL1 to DLm. The gate driver 30 provides scanning signals to the gate lines GL1 to GLn. The timing controller 40 arranges and provides source RGB data signals, received from the outside, to the data driver 20. The timing controller 40 generates a data control signal DCS to control the data driver 20 and generates a gate control signal GCS to control the gate driver 30.

The liquid crystal panel 12 includes a transistor array substrate and a color filter array substrate that are laminated together, spacers that maintain a cell gap between the two array substrates, and a liquid crystal that fills in the cell gap.

The liquid crystal panel 12 includes liquid crystal cells formed respectively in areas defined by the n gate lines GL1 to GLn and the m data lines DL1 to DLm and thin film transistors (TFTs) connected respectively to the liquid crystal cells. In response to scanning signals from the gate lines GL1 to GLn, the TFTs provide data signals received from the data lines DL1 to DLm to the liquid crystal cells. Each of the liquid crystal cells includes a common electrode and a pixel electrode connected to a corresponding TFT that face each other with a liquid crystal therebetween. Thus, each liquid crystal cell can be equivalently expressed by a liquid crystal capacitor Clc. Each liquid crystal cell also includes a storage capacitor that is connected to a previous gate line to maintain a data signal with which the liquid crystal capacitor Clc is charged until the liquid crystal capacitor Clc is charged with a next data signal.

The timing controller 40 formats source RGB data signals received from the outside so as to be suitable to drive the liquid crystal panel 12 and provides such formatted source RGB data signals to the data driver 20. Using a main clock MCLK, a data enable signal DE, and horizontal and vertical synchronization signals Hsync and Vsync, the timing controller 40 generates a data control signal DCS and a gate control signal GCS to control the drive timings of the data driver 20 and the gate driver 30.

The gate driver 30 includes a shift register that sequentially generates scanning signals (i.e., high gate pulses) in response to a gate start pulse GSP and a gate shift clock GSC included in the gate control signal GCS from the timing controller 40. The gate driver 30 sequentially provides the high gate pulses to gate lines GL1 to GLn in the liquid crystal panel 12 to turn on TFTs connected to the gate lines GL1 to GLn.

The data driver 20 converts the formatted data signals Data from the timing controller 40 to analog video signals according to the data control signal DCS received from the timing controller 40. The data driver 20 provides the analog video signals, corresponding to a single horizontal line, to the data lines DL1 to DLm every horizontal period during which a single scanning signal is provided. In response to a polarity control signal POL, the data driver 20 reverses the polarity of the analog video signals Data to be provided to the data line DL1 to DLm on a line by line basis.

After the transistor array substrate and the color filter array substrate are laminated together with a liquid crystal therebetween, the transistor array substrate is generally subjected to a test process before the data driver 20 and the gate driver 30 are electrically connected to the transistor array substrate.

In the test process, an auto-probe test apparatus is used to determine if disconnections and point and line defects are present in the liquid crystal panel 12.

FIG. 2 shows a schematic diagram of an apparatus for testing an LCD according to the related art.

As shown in FIG. 2, the related art apparatus for auto-probe testing an LCD includes a stage 50 on which a liquid crystal panel to be tested is placed, a data probe unit 60 that provides test pattern signals to a plurality of vertically divided blocks of the liquid crystal panel placed on the stage 50, a gate probe unit 70 that provides scanning signals to a plurality of horizontally divided blocks of the liquid crystal panel placed on the stage 50, and a controller 80 that provides test pattern signals to the data probe unit 60 and provides scanning signals to the gate probe unit 70.

The stage 50 supports a liquid crystal panel to be tested and illuminates the rear surface of the liquid crystal panel through a lighting device (not shown).

The data probe unit 60 includes a plurality of data connector blocks 62 corresponding respectively to the vertical blocks of the liquid crystal panel. In the following description, it is assumed that the data probe unit 60 includes 12 data connector blocks 62.

As shown in FIG. 3, each of the data connector blocks 62 includes a plurality of data connector pads 64 having the same shape as a plurality of data pads provided in each of the respective data pad portions of the vertical blocks of a liquid crystal panel to be placed on the stage 50. The data connector pads 64 of each data connector block 62 are commonly connected to a single test pattern signal transmission line 82, through which they receive a test pattern signal from the controller 80.

The data probe unit 60 is moved vertically by a drive unit (not shown) so that the data connector pads 64 of the data connector blocks 62 of the data probe unit 60 are brought into contact with the data pads of the vertical blocks of the liquid crystal panel placed on the stage 50. Thus, through each data connector pad 64 of each data connector block 62 of the data probe unit 60, a test pattern signal from the controller 80 is provided to each data pad of each vertical block of the liquid crystal panel placed on the stage 50.

The gate probe unit 70 includes a plurality of gate connector blocks 72 corresponding respectively to the horizontal blocks of the liquid crystal panel. In the following description, it is assumed that the gate probe unit 70 includes 4 gate connector blocks 72.

As shown in FIG. 3, each of the gate connector blocks 72 includes a plurality of gate connector pads 74 having the same shape as a plurality of gate pads provided in each of the respective gate pad portions of the horizontal blocks of a liquid crystal panel to be placed on the stage 50. The gate connector pads 74 of each gate connector block 72 are commonly connected to a single scanning signal transmission line 84 through which they receive a scanning signal from the controller 80.

The gate probe unit 70 is moved vertically by a drive unit (not shown) so that the gate connector pads 74 of the gate connector blocks 72 of the gate probe unit 70 are brought into contact with the gate pads of the horizontal blocks of the liquid crystal panel placed on the stage 50. Thus, through the gate connector pads 74 of the gate connector blocks 72 of the gate probe unit 70, scanning signals from the controller 80 are sequentially provided to the gate pads of the horizontal blocks of the liquid crystal panel placed on the stage 50.

The controller 80 generates and provides twelve test pattern signals to the twelve data connector blocks 62 of the data probe unit 60 through the twelve test pattern signal transmission lines 82, respectively. The controller 80 sequentially generates and provides four scanning signals to the four gate connector blocks 72 of the gate probe unit 70 through the four scanning signal transmission lines 84, respectively.

FIGS. 4A and 4B schematically illustrate a method for testing an LCD using a conventional auto-probe test apparatus.

The method for testing an LCD using the related art auto-probe test apparatus will now be described with reference to FIGS. 4A and 4B.

First, a liquid crystal panel 12 is placed on the stage 50 as shown in FIG. 4A. The liquid crystal panel 12 includes data pad portions 4 that are divided into 12 blocks having a plurality of data pads connected to data lines DL, and gate pad portions 6 that are divided into 4 blocks having a plurality of data pads connected to gate lines GL.

Then, the data probe unit 60 is moved down toward the stage 50 so that the data connector pads 64 of the data connector blocks 62 are electrically connected to the data pads of the vertical blocks of the liquid crystal panel 12 placed on the stage 50. At the same time, the gate probe unit 70 is moved down toward the stage 50 so that the gate connector pads 74 of the gate connector blocks 72 are electrically connected to the gate pads of the horizontal blocks of the liquid crystal panel 12 placed on the stage 50.

Next, the controller 80 provides scanning signals to the gate connector blocks 72 through the scanning signal transmission lines 84 and provides test pattern signals to the data connector blocks 62 through the test pattern signal transmission lines 82. Specifically, as shown in FIG. 5, the controller 80 provides four scanning signals GB1 to GB4 to the gate connector blocks 72 and provides twelve test pattern signals DB1 to DB12 to the data connector blocks 62.

Accordingly, test pattern images corresponding to the test pattern signals are displayed on the liquid crystal panel 12 as shown in FIG. 6.

Specifically, in a first period of a first frame, a first scanning signal GB1 is provided from the first gate connector block 72 to the gate pad portion 6 of the first horizontal block. In synchronization with the first scanning signal GB1, twelve test pattern signals DB1 to DB12 corresponding to white images W are provided from the twelve data connector blocks 62 to the data pad portions 4 of the twelve vertical blocks. Accordingly, in the first period of the first frame, white test pattern images W corresponding to the twelve test pattern signals DB1 to DB12 are displayed on the first horizontal block that receives the first scanning signal GB1.

In a second period of the first frame, a second scanning signal GB2 is provided from the second gate connector block 72 to the gate pad portion 6 of the second horizontal block. In synchronization with the second scanning signal GB2, first, second, eleventh, and twelfth test pattern signals DB1, DB2, DB1, and DB12 corresponding to white images W are provided from the first, second, eleventh, and twelfth data connector blocks 62 to the data pad portions 4 of the first, second, eleventh, and twelfth vertical blocks, while third to tenth test pattern signals DB3 to DB10 corresponding to black images B are provided from the third to tenth data connector blocks 62 to the data pad portions 4 of the third to tenth vertical blocks. Accordingly, in the second period of the first frame, white test pattern images W corresponding to the first, second, eleventh, and twelfth test pattern signals DB1, DB2, DB11, and DB12 are displayed on first, second, eleventh, and twelfth vertical blocks in the second horizontal block that receives the second scanning signal GB2, and black test pattern images B corresponding to the third to tenth test pattern signals DB3 to DB10 are displayed on the other vertical blocks in the second horizontal block.

In a third period of the first frame, a third scanning signal GB3 is provided from the third gate connector block 72 to the gate pad portion 6 of the third horizontal block. In synchronization with the third scanning signal GB3, first, second, eleventh, and twelfth test pattern signals DB1, DB2, DB11, and DB12 corresponding to white images W are provided from the first, second, eleventh, and twelfth data connector blocks 62 to the data pad portions 4 of the first, second, eleventh, and twelfth vertical blocks, while third to tenth test pattern signals DB3 to DB10 corresponding to black images B are provided from the third to tenth data connector blocks 62 to the data pad portions 4 of the third to tenth vertical blocks. Accordingly, in the third period of the first frame, white test pattern images W corresponding to the first, second, eleventh, and twelfth test pattern signals DB1, DB2, DB11, and DB12 are displayed on first, second, eleventh, and twelfth vertical blocks in the third horizontal block that receives the third scanning signal GB3, and black test pattern images B corresponding to the third to tenth test pattern signals DB3 to DB10 are displayed on the other vertical blocks in the third horizontal block.

Finally, in a fourth period of the first frame, a fourth scanning signal GB4 is provided from the fourth gate connector block 72 to the gate pad portion 6 of the fourth horizontal block. In synchronization with the fourth scanning signal GB4, twelve test pattern signals DB1 to DB12 corresponding to white images W are provided from the twelve data connector blocks 62 to the data pad portions 4 of the twelve vertical blocks. Accordingly, in the fourth period of the first frame, white test pattern images W corresponding to the twelve test pattern signals DB1 to DB12 are displayed on the fourth horizontal block in the liquid crystal panel 12 that receives the fourth scanning signal GB4.

In the method for testing an LCD using the related art auto-probe test apparatus, images corresponding to the twelve test pattern signals DB1 to DB12 are displayed on the liquid crystal panel 12 according to scanning signals from the auto-probe test apparatus to examine if disconnections and point and line defects are present in the liquid crystal panel 12.

The related art LCD auto-probe test apparatus and method needs the same number of data connector pads as that of data pads of the data pad portions of the liquid crystal panel 12.

Thus, as the number of data pads increases, the number of data connector pads (i.e., the number of channels) in the probe unit increases, thereby increasing the cost of the auto-probe test apparatus.

In addition, as the pitch between data pads is decreased due to an increase in the resolution of the liquid crystal panel 12, it is difficult to accurately align data connector pads with data pads in the related art LCD auto-probe test apparatus and method.

SUMMARY OF THE INVENTION

Accordingly, the present invention is directed to an apparatus and method for testing a liquid crystal display that substantially obviates one or more problems due to limitations and disadvantages of the related art.

An object of the present invention is to provide an apparatus and method for testing a liquid crystal display that reduces the number of channels of a probe unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for testing a liquid crystal display including: a stage on which a liquid crystal panel is placed; a plurality of vertically divided blocks, wherein each of the vertically divided blocks include a plurality of adjacent data lines; a data probe unit that provides test pattern signals respectively to groups of at least two of the plurality of vertically divided blocks of the liquid crystal panel; a plurality of horizontally divided blocks, wherein each of the horizontally divided blocks include a plurality of adjacent gate lines; a gate probe unit that provides scanning signals respectively to the plurality of horizontally divided blocks of the liquid crystal panel; and a controller that provides test pattern signals to the data probe unit and provides scanning signals to the gate probe unit.

In another aspect of the present invention, a method for testing a liquid crystal display, includes: placing a liquid crystal panel on a stage; generating a plurality of test pattern signals and a plurality of scanning signals; sequentially providing the scanning signals to a plurality of horizontally divided blocks of the liquid crystal panel; and providing the test pattern signals respectively to groups of at least two of a plurality of vertically divided blocks of the liquid crystal panel in synchronization with each of the scanning signals.

In another aspect of the present invention, a method of forming a liquid crystal display, includes: forming a plurality of gate lines with gate pads at an end of the gate line, wherein the plurality of gate lines include a plurality of vertically divided blocks that include a plurality of adjacent gate lines; forming a plurality of data lines with data pads at an end of the data line, wherein the plurality of data lines include a plurality of horizontally divided blocks that include a plurality of adjacent data lines; forming a plurality of gate connector pads, wherein the plurality of gate connector pads are arranged into two gate connector blocks corresponding and adjacent to one of the vertically divided blocks and that are electrically connected to the gate lines in the one of the vertically divided blocks; forming a plurality of data connector pads, wherein the plurality of data connector pads are arranged into two data connector blocks corresponding and adjacent to one of the horizontally divided blocks and that are electrically connected to the data lines in the one of the horizontally divided blocks.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 6 illustrates images displayed on the liquid crystal panel according to the test pattern signals shown in FIG. 5;

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
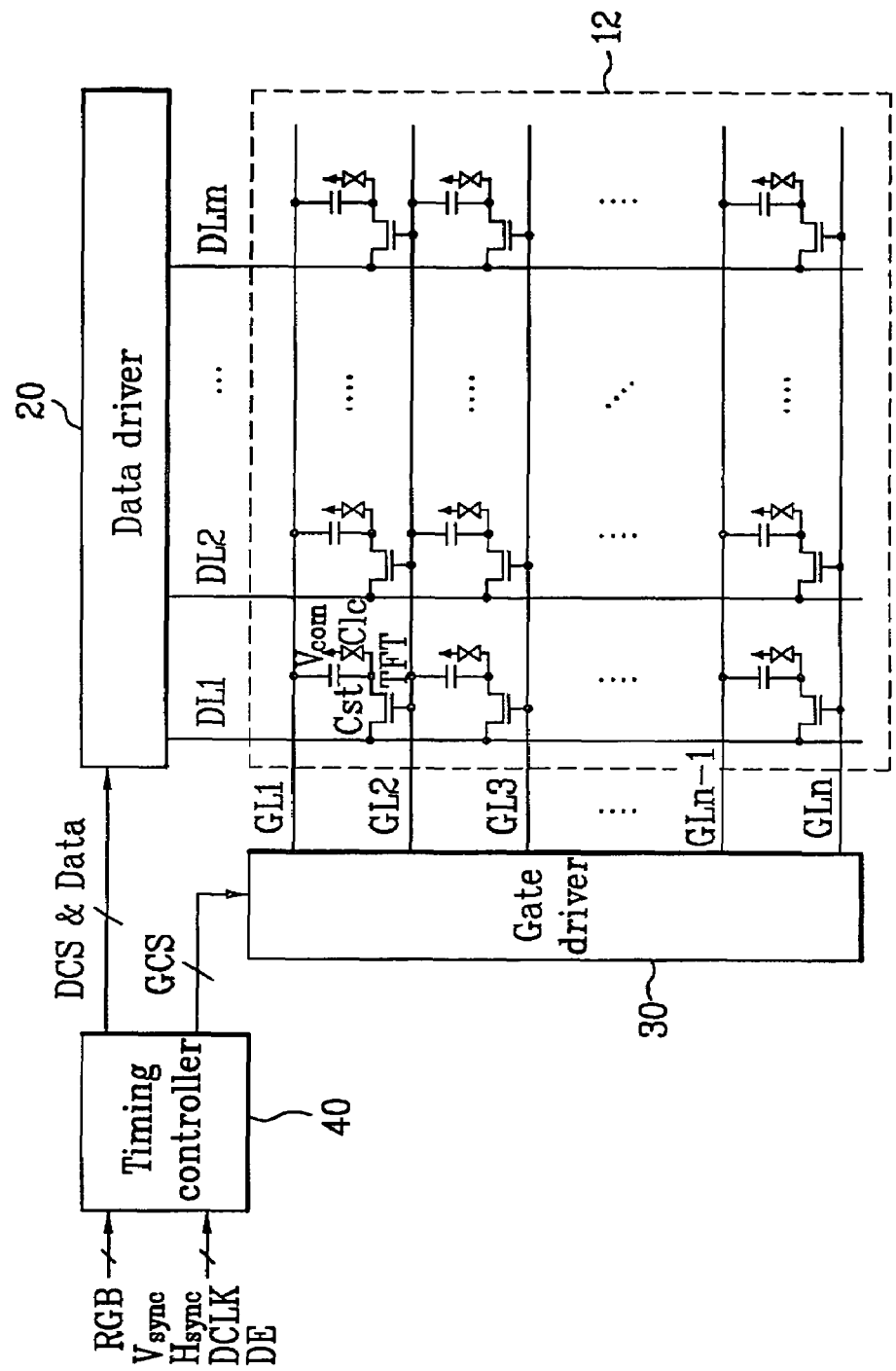
FIG. 1 schematically illustrates a conventional liquid crystal display.
Figure 2:
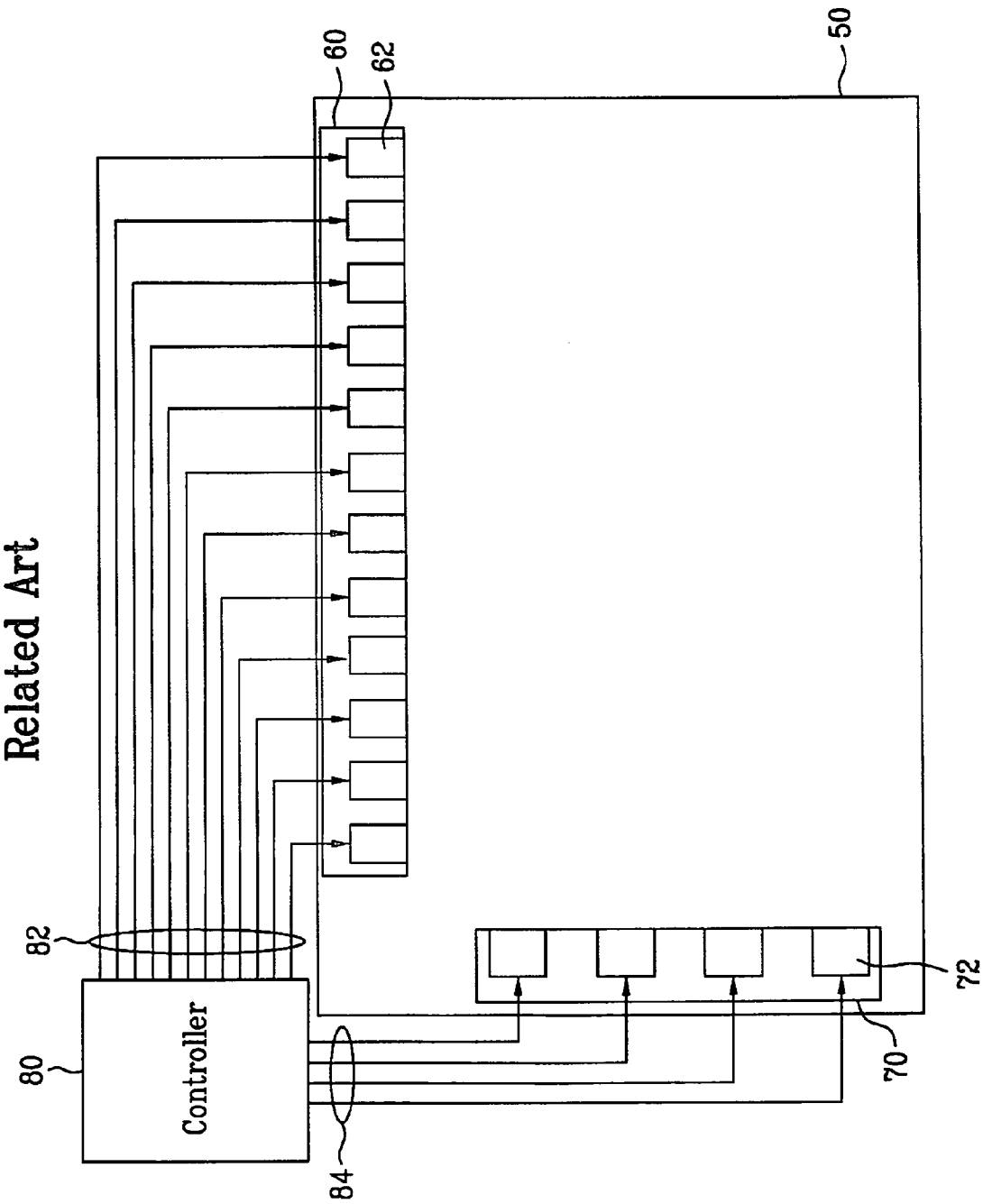
FIG. 2 schematically illustrates a conventional apparatus for testing a liquid crystal display.
Figure 3:
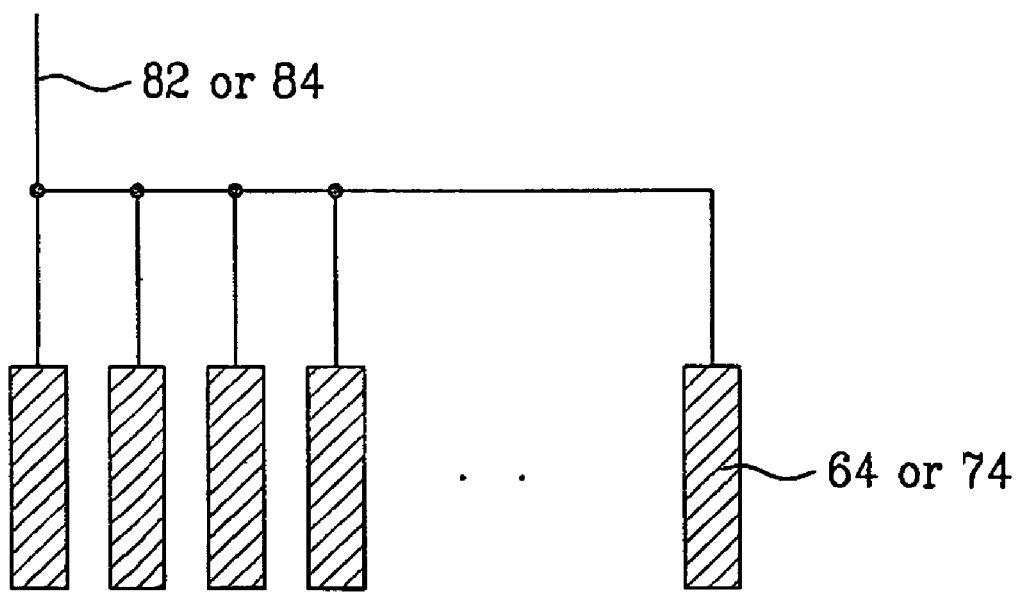
FIG. 3 illustrates a data connector block and a gate connector block shown in FIG. 2.
Figure 4A:
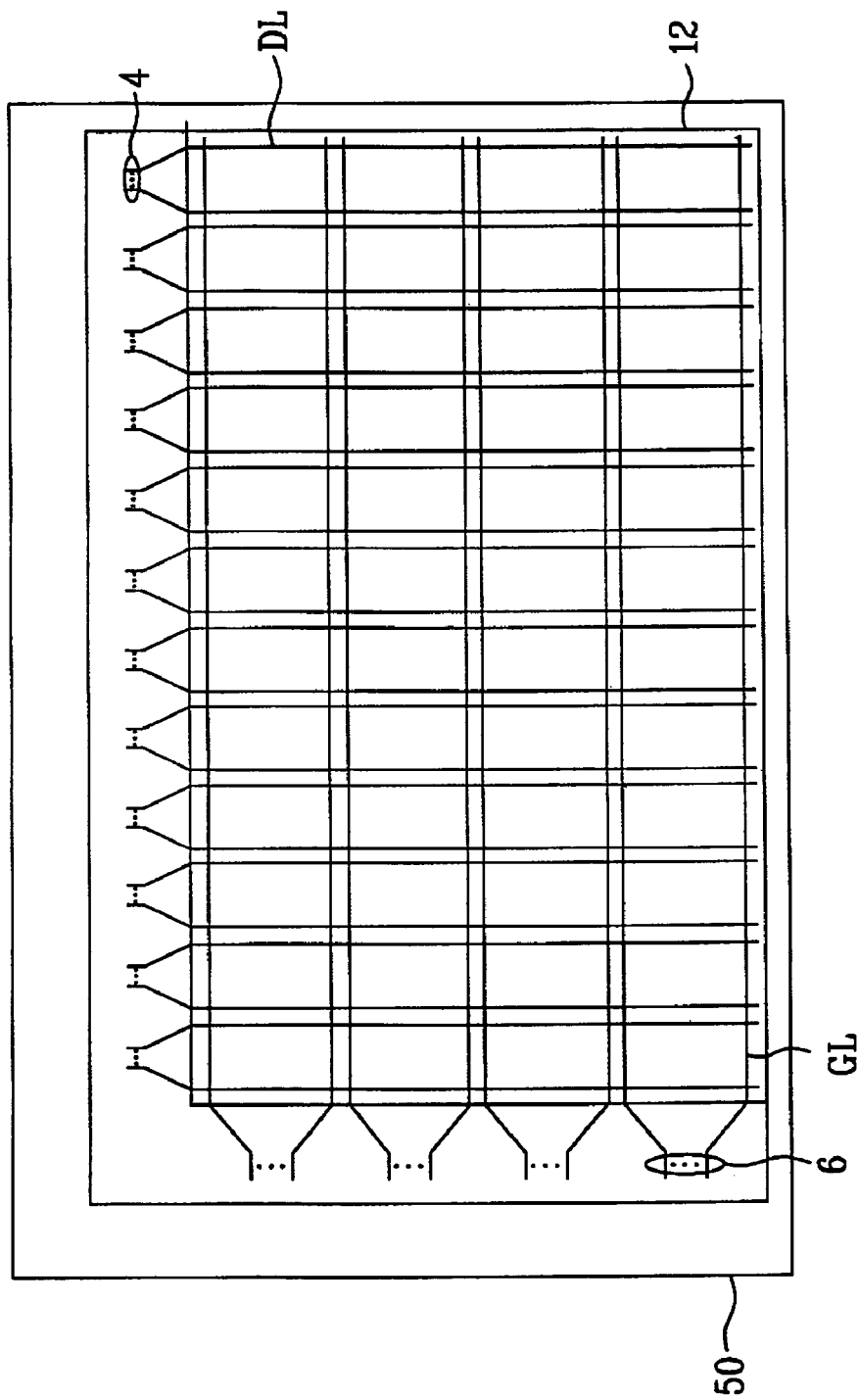
FIGS. 4A and 4B schematically illustrate a conventional method for testing a liquid crystal display.
Figure 4B:
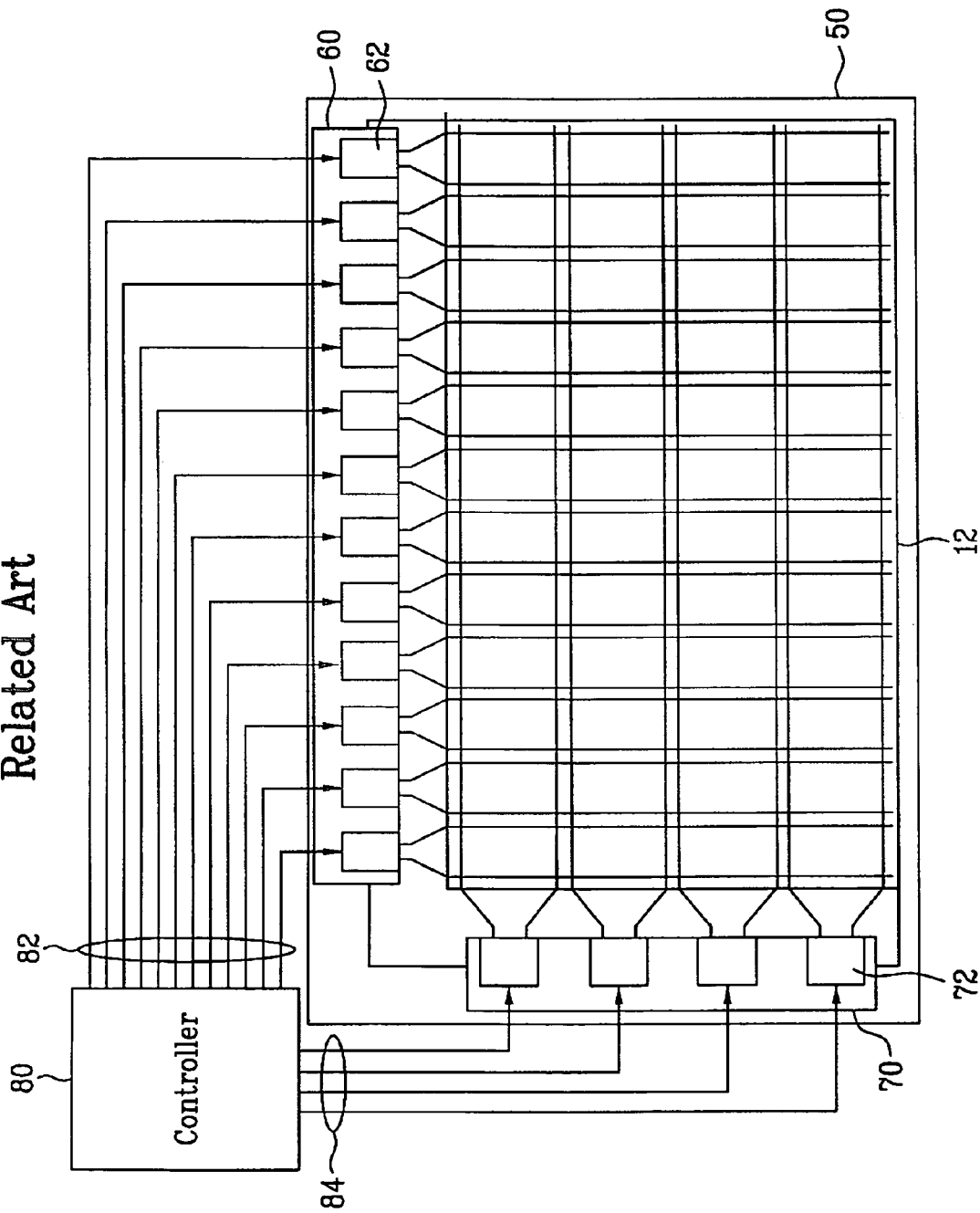
Figure 5:
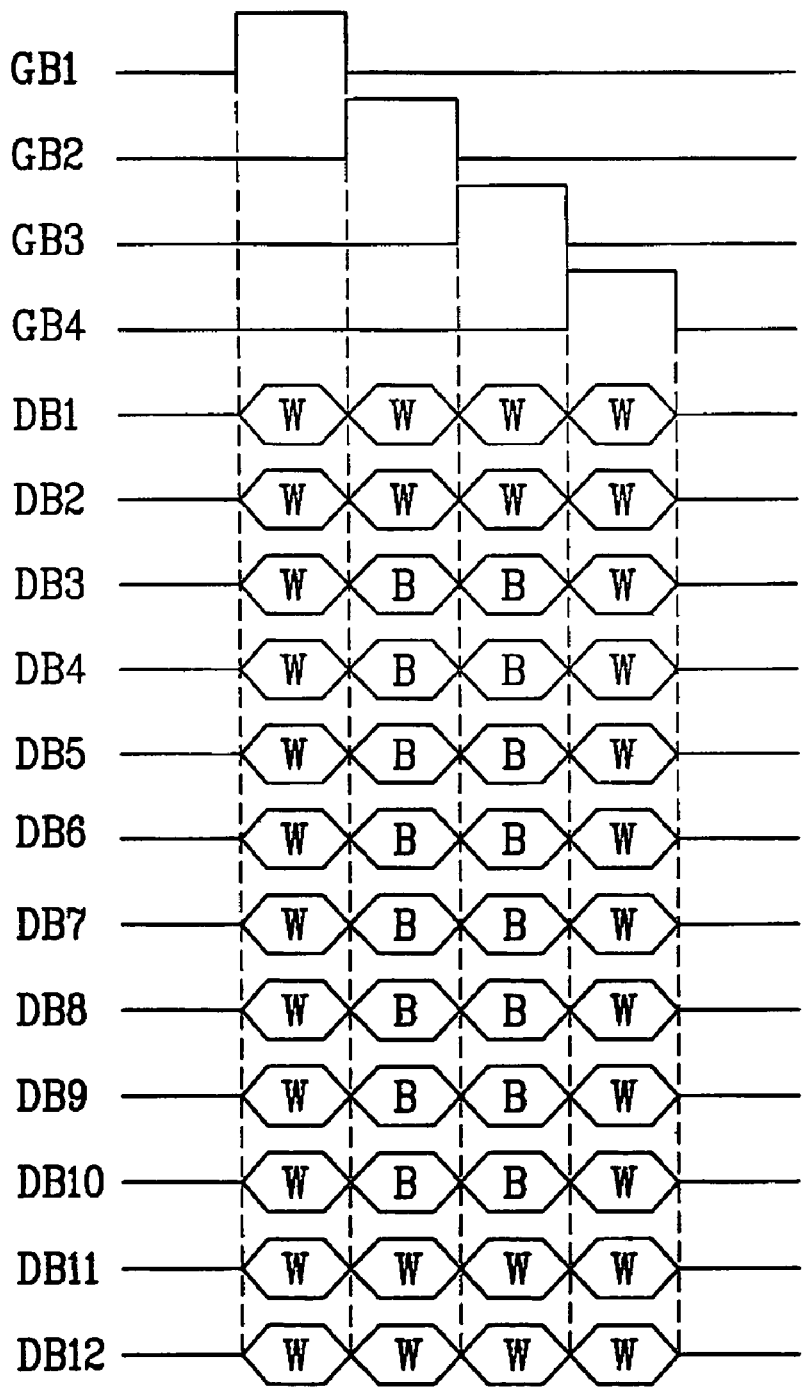
FIG. 5 is a waveform diagram illustrating test pattern signals and scanning signals provided to a liquid crystal panel shown in FIGS. 4A and 4B.
Figure 7:
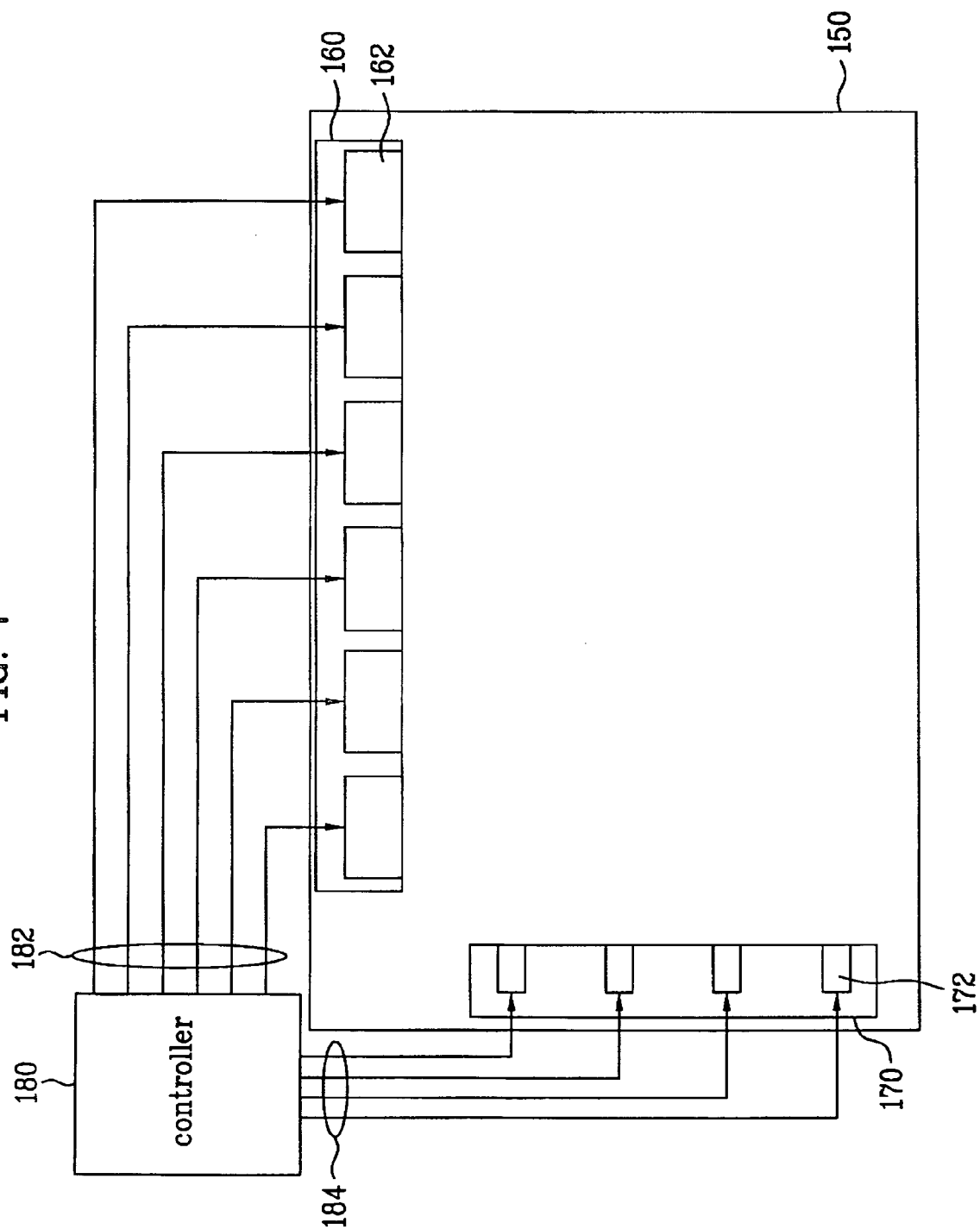
FIG. 7 schematically illustrates an apparatus for testing a liquid crystal display according to an embodiment of the present invention.

FIG. 7 schematically illustrates an apparatus for testing an LCD according to an embodiment of the present invention.

As shown in FIG. 7, the apparatus for testing an LCD includes a stage 150 on which a liquid crystal panel to be tested is placed, a data probe unit 160 that provides test pattern signals respectively to groups of two of a plurality of vertically divided blocks of the liquid crystal panel placed on the stage 150, a gate probe unit 170 that provides scanning signals to a plurality of horizontally divided blocks of the liquid crystal panel placed on the stage 150, and a controller 180 that provides test pattern signals to the data probe unit 160 and provides scanning signals to the gate probe unit 170.

The stage 150 supports a liquid crystal panel to be tested and illuminates the rear surface of the liquid crystal panel through a lighting device (not shown).

The data probe unit 160 includes a plurality of data connector blocks 162 corresponding respectively to a plurality of groups of two of the vertical blocks of the liquid crystal panel. In the following description, it is assumed that the liquid crystal panel is divided into 12 vertical blocks, grouped into 6 groups of two vertical blocks, and the data probe unit 160 includes 6 data connector blocks 162 corresponding respectively to the 6 groups of two vertical blocks.

Figure 8:
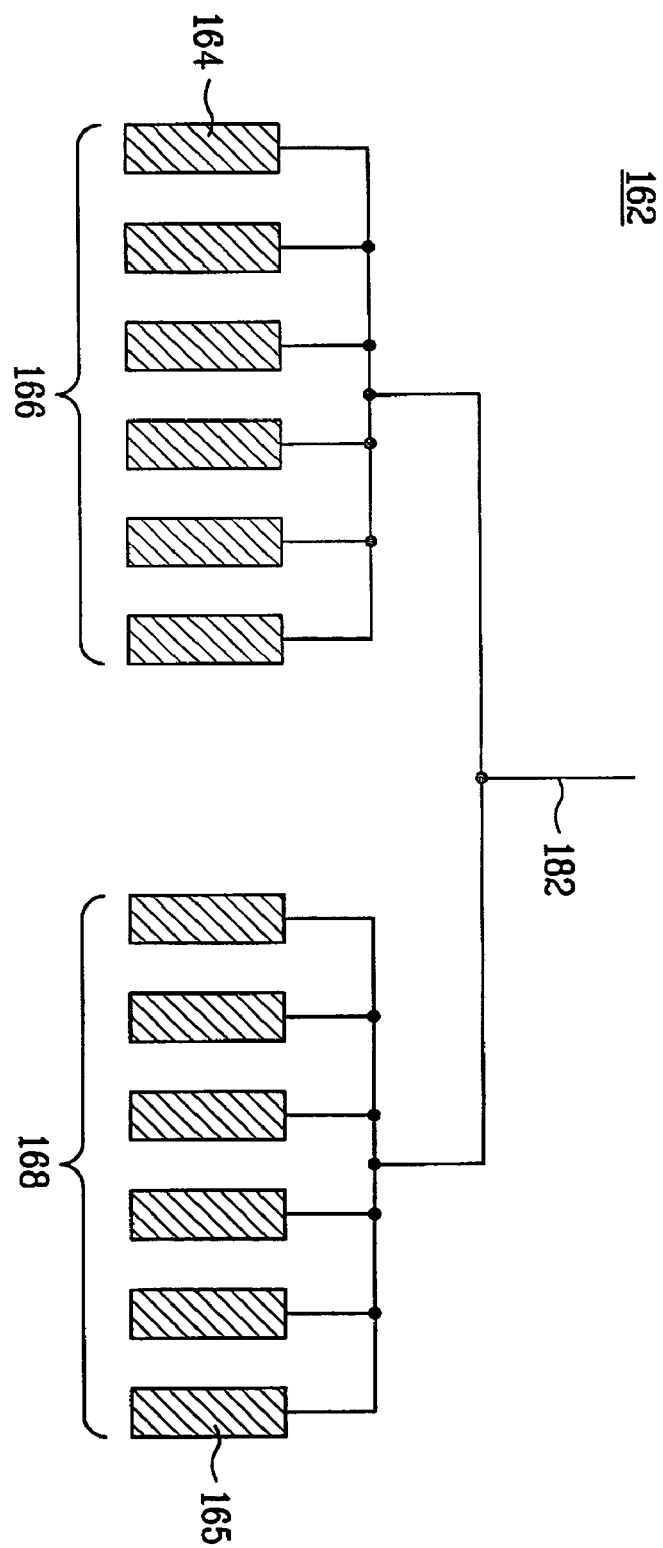
FIG. 8 illustrates a data connector block shown in FIG. 7.

As shown in FIG. 8, each of the data connector blocks 162 includes a first data connector pad portion 166, through which a test pattern signal transmitted from the controller 180 through a test pattern signal transmission line 182 is provided to a first vertical block of a group of two vertical blocks corresponding to the data connector block, and a second data connector pad portion 168, through which the test pattern signal is provided to a second vertical block of the corresponding group of two vertical blocks.

The first data connector pad portion 166 includes 6 first data connector pads 164 having the same shape as a plurality of data pads provided in each of the respective data pad portions of the vertical blocks of a liquid crystal panel to be placed on the stage 150. The 6 first data connector pads 164 are commonly connected to the test pattern signal transmission line 182.

The second data connector pad portion 168 includes 6 second data connector pads 165 having the same shape as a plurality of data pads provided in each of the respective data pad portions of the vertical blocks of a liquid crystal panel to be placed on the stage 150. The 6 second data connector pads 165 are commonly connected to the test pattern signal transmission line 182.

Each of the data connector blocks 162 is connected to a single test pattern signal transmission line 182 and provides a test pattern signal to data pad portions of a corresponding group of two of the plurality of vertical blocks of the liquid crystal panel.

The data probe unit 160 is moved vertically by a drive unit (not shown) so that the first and second data connector pad portions 166 and 168 of the data connector blocks 162 of the data probe unit 160 are brought into contact with the data pad portions of the vertical blocks of the liquid crystal panel. Thus, through each pair of first and second data connector pad portions 166 and 168, a test pattern signal from the controller 180 is provided to the data pad portions of a corresponding group of two vertical blocks.

The gate probe unit 170 includes a plurality of gate connector blocks 172 corresponding respectively to the horizontal blocks of the liquid crystal panel. In the following description, it is assumed that the liquid crystal panel is divided into 4 horizontal blocks and the gate probe unit 170 includes 4 gate connector blocks 172 corresponding respectively to the 4 horizontal blocks.

Each of the gate connector blocks 172 includes a plurality of gate connector pads having the same shape as a plurality of gate pads provided in each of the respective gate pad portions of the horizontal blocks of a liquid crystal panel to be placed on the stage 150. The gate connector pads of each gate connector block 172 are commonly connected to a single scanning signal transmission line 184, through which they receive a scanning signal from the controller 180.

The gate probe unit 170 is moved vertically by a drive unit (not shown) so that the gate connector pads of the gate connector blocks 172 of the gate probe unit 170 are brought into contact with the gate pads of the horizontal blocks of the liquid crystal panel placed on the stage 50. Thus, through the gate connector pads of the gate connector blocks 172 of the gate probe unit 170, scanning signals from the controller 180 are sequentially provided to the gate pads of the horizontal blocks of the liquid crystal panel placed on the stage 150.

The controller 180 generates and provides six test pattern signals to the six data connector blocks 162 of the data probe unit 160 through the six test pattern signal transmission lines 182, respectively. The controller 180 sequentially generates and provides four scanning signals to the four gate connector blocks 172 of the gate probe unit 170 through the four scanning signal transmission lines 184, respectively.

Figure 9:
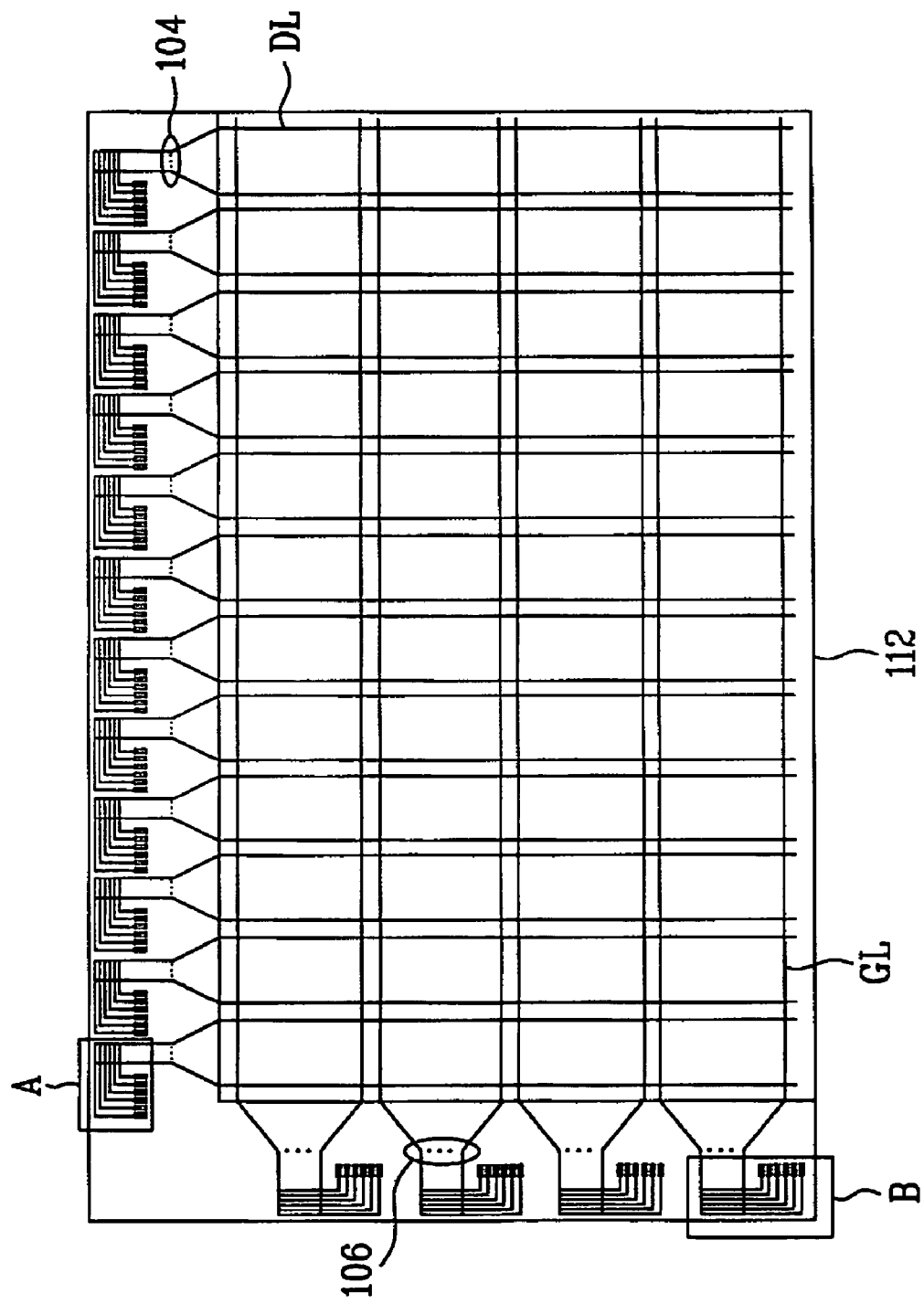
FIG. 9 schematically illustrates a liquid crystal display according to an embodiment of the present invention.

FIG. 9 is a plan view schematically showing a liquid crystal panel to be placed on the stage shown in FIG. 7.

As shown in FIG. 9, the liquid crystal panel 112 includes a transistor array substrate and a color filter array substrate that are laminated together, spacers that maintain a cell gap between the two array substrates, and a liquid crystal that fills the cell gap.

The transistor array substrate includes liquid crystal cells formed respectively in areas defined by a plurality of gate lines GL and a plurality of data lines DL and thin film transistors (TFTs) (not shown) connected respectively to the liquid crystal cells. In response to scanning signals from the gate lines GL, the TFTs provide data signals received from the data lines DL to the liquid crystal cells. Each of the liquid crystal cells includes a common electrode and a pixel electrode connected to a corresponding TFT that face each other with a liquid crystal therebetween. Thus, each liquid crystal cell may be equivalently expressed by a liquid crystal capacitor. Each liquid crystal cell also includes a storage capacitor that is connected to a previous gate line to maintain a data signal with which the liquid crystal capacitor is charged until the liquid crystal capacitor is charged with a next data signal.

The liquid crystal panel 112 is divided vertically into a plurality of blocks and horizontally into a plurality of blocks, according to its resolution.

A data pad portion 104 including a plurality of data pads, which are to be electrically connected to a data driver integrated circuit (not shown) through a module process, is formed on each vertical block at one end thereof. A gate pad portion 106 including a plurality of gate pads, which are to be electrically connected to a gate driver integrated circuit (not shown) through the module process, is formed on each horizontal block at one end thereof. In the following description, it is assumed that the liquid crystal panel is divided vertically into 12 blocks and horizontally into 4 blocks.

Figure 10A:
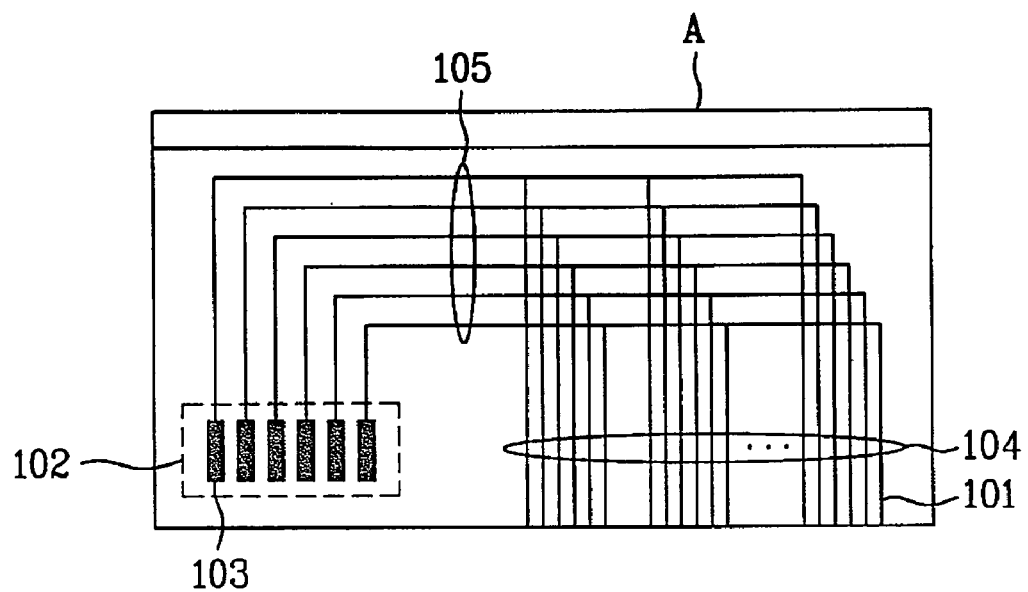
FIGS. 10A and 10B illustrate a data pad portion of each vertical block shown in FIG. 9.

As shown in FIG. 10A, the data pad portion 104 of each vertical block is provided with a test data pad portion 102 having 6 test data pads 103 that are electrically connected to a plurality of data pads 101 of the data pad portion 104 through 6 dummy common data lines 105.

The test data pads 103, which are electrically connected respectively to the dummy common data lines 105, are formed at a side of each data pad portion 104. Each of the test data pads 103 is formed to have a greater width than each of the data pads 101 and to have the same shape as each of the data connector pads of the data probe unit.

Each group of 6 of the plurality of data pads 101 are commonly connected to the 6 dummy common data lines 105. Each group of 6 data pads 101 extend, crossing the 6 dummy common data lines 105 at a right angle, and are sequentially connected to the 6 dummy common data lines 105 through 6 via holes (not shown).

Figure 10B:
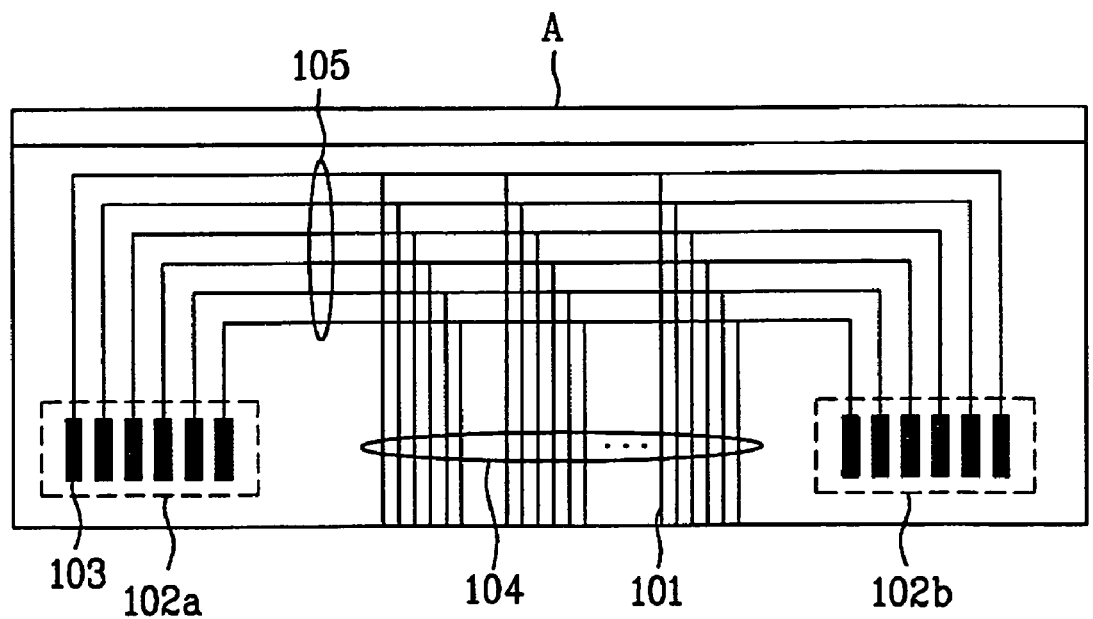

As shown in FIG. 10B, test data pad portions 102a and 102b in the same shape may be formed at both sides of the data pad portion 104. In this case, data connector blocks are also formed in the same shape as the test data pad portions 102a and 102b formed at both sides of the data pad portion 104.

Figure 11A:
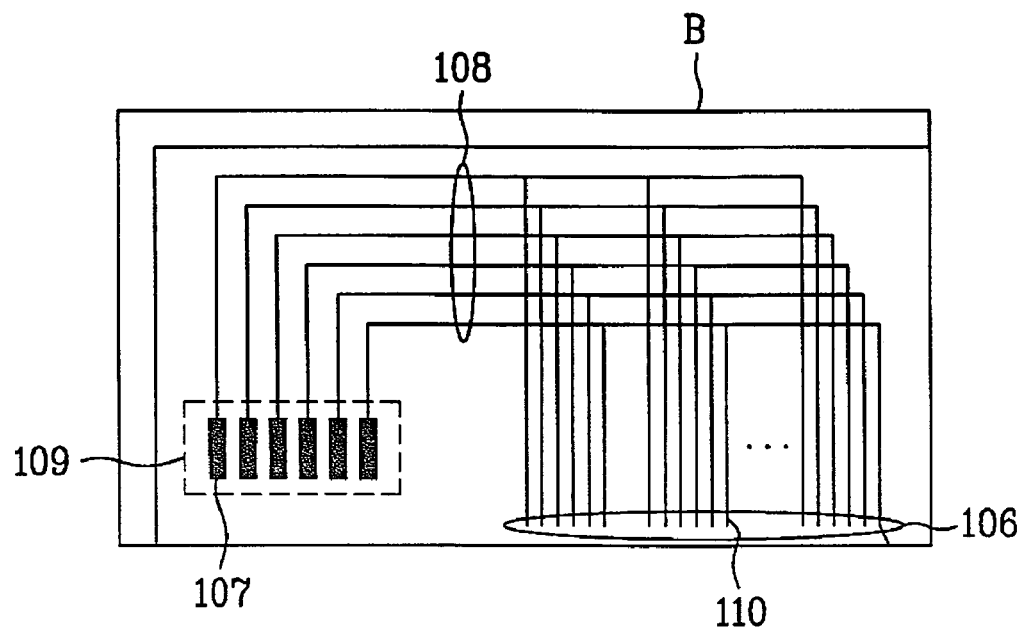
FIGS. 11A and 11B illustrate a gate pad portion of each horizontal block shown in FIG. 9.

As shown in FIG. 11A, the gate pad portion 106 of each horizontal block is provided with a test gate pad portion 109 having 6 test gate pads 107 that are electrically connected to a plurality of gate pads 110 of the gate pad portion 106 through 6 dummy common gate lines 108.

The test gate pads 107, which are electrically connected respectively to the dummy common gate lines 108, are formed at a side of each gate pad portion 106. Each of the test gate pads 107 is formed to have a greater width than each of the gate pads 110 and to have the same shape as each of the gate connector pads of the gate probe unit.

Each group of 6 of the plurality of gate pads 110 are commonly connected to the 6 dummy common gate lines 108. Each group of 6 gate pads 110 extend, crossing the 6 dummy common gate lines 108 at a right angle, and are sequentially connected to the 6 dummy common gate lines 108 through 6 via holes (not shown).

Figure 11B:
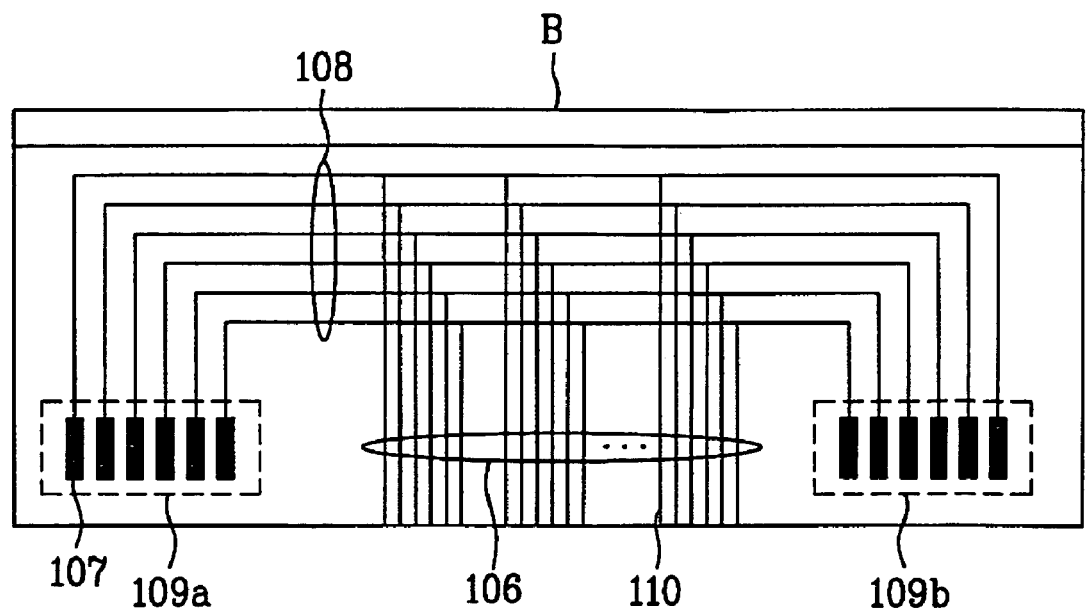

As shown in FIG. 11B, test gate pad portions 109a and 109b in the same shape may be formed at both sides of the gate pad portion 106. In this case, gate connector blocks are also formed in the same shape as the test gate pad portions 109a and 109b formed at both sides of the gate pad portion 106.

Figure 12:
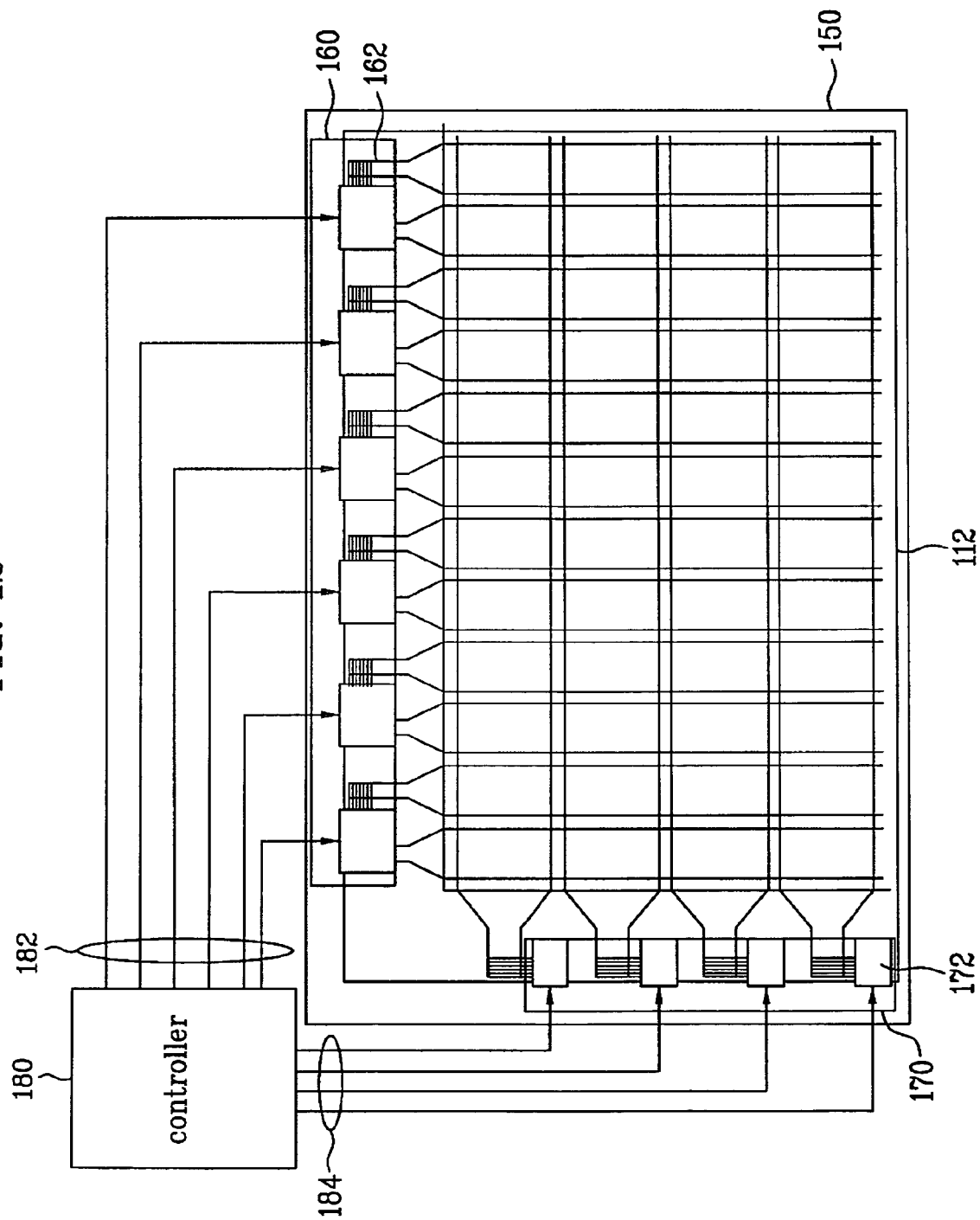
FIG. 12 illustrates a method for testing a liquid crystal display according to an embodiment of the present invention.

FIG. 12 illustrates a method and apparatus for testing a liquid crystal display according to an embodiment of the present invention.

The LCD test method and apparatus according to the embodiment of the present invention will now be described with reference to FIG. 12 in conjunction with FIGS. 8 to 11.

First, a liquid crystal panel 12, which is divided vertically into 12 blocks and horizontally into 4 blocks as shown in FIG. 9, is placed on the stage 150 of the test apparatus (specifically, an auto-probe test apparatus).

Then, the data probe unit 160 is moved down toward the stage 150, and the data connector pads 164 and 165 of the data connector blocks 162 are aligned with the test data pads 103 of the liquid crystal panel 112 placed on the stage 150 and then the data connector pads 164 and 165 are electrically connected to the test data pads 103. Accordingly, the data connector pads 164 and 165 of the data connector blocks 162 are electrically connected to the test data pads 103 formed on a plurality of groups of two of the vertical blocks of the liquid crystal panel 112. Specifically, a first data connector pad portion 166 of each data connector block 162 is electrically connected to test data pads 103 of a first vertical block of a group of two vertical blocks corresponding to the data connector block 162, and a second data connector pad portion 168 thereof is electrically connected to test data pads 103 of a second vertical block of the corresponding group of two vertical blocks.

At the same time, the gate probe unit 170 is moved down toward the stage 150, and the gate connector pads of the gate connector blocks 172 are aligned with the test gate pads 107 of the liquid crystal panel 112 placed on the stage 150 and then the gate connector pads are electrically connected to the test gate pads 107. Accordingly, the gate connector pads of the gate connector blocks 172 are electrically connected to the test gate pads 107 formed on the horizontal blocks of the liquid crystal panel 112.

Figure 13:
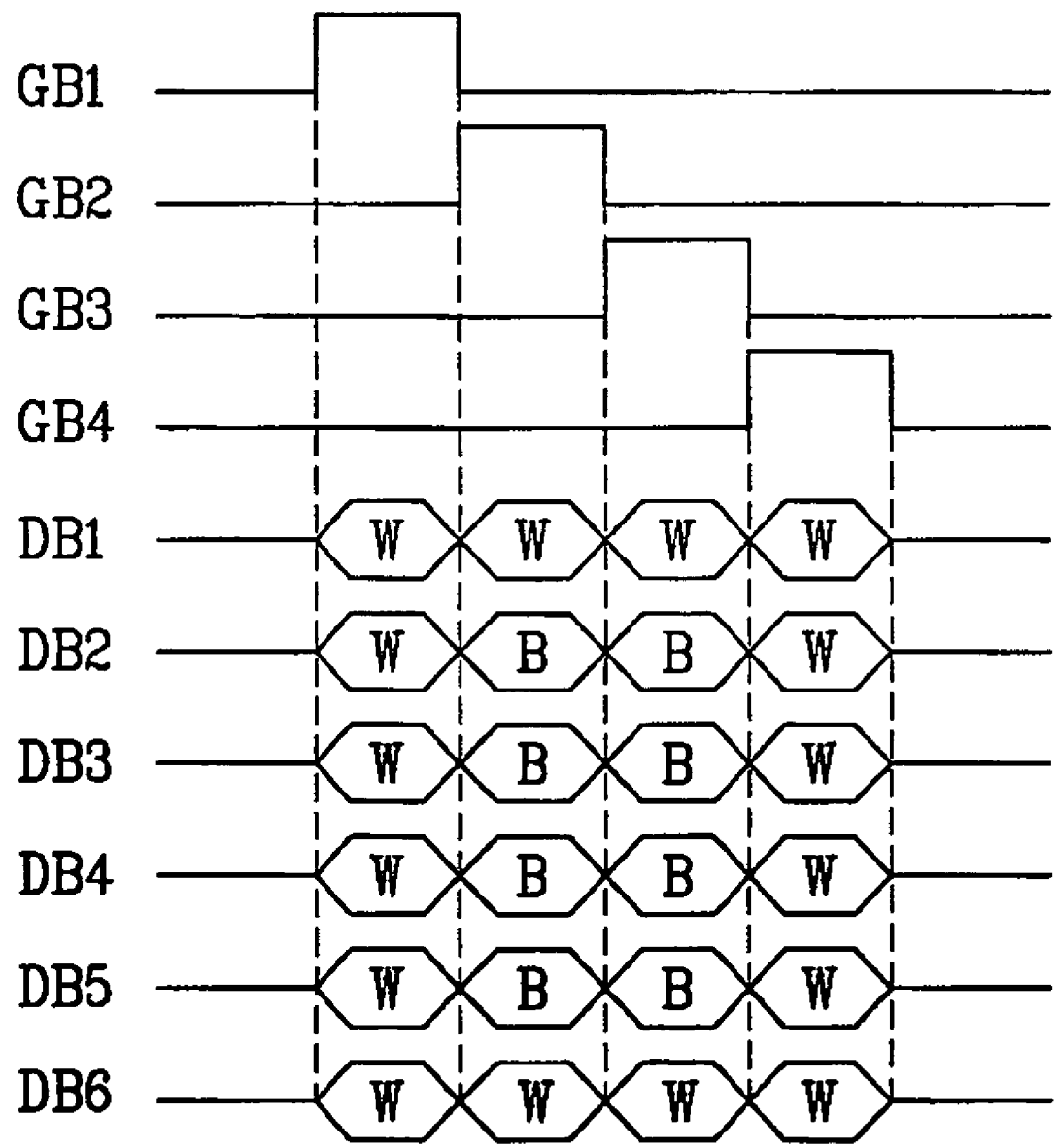
FIG. 13 is a waveform diagram illustrating test pattern signals and scanning signals provided to a liquid crystal panel shown in FIG. 12.

Then, the controller 180 provides scanning signals to the gate connector blocks 172 through a plurality of scanning signal transmission lines 184 and provides test pattern signals to the data connector blocks 162 through a plurality of test pattern signal transmission lines 182. Specifically, as shown in FIG. 13, the controller 180 provides four scanning signals GB1 to GB4 to the gate connector blocks 172 and provides six test pattern signals DB1 to DB6 to the data connector blocks 162.

Figure 14:
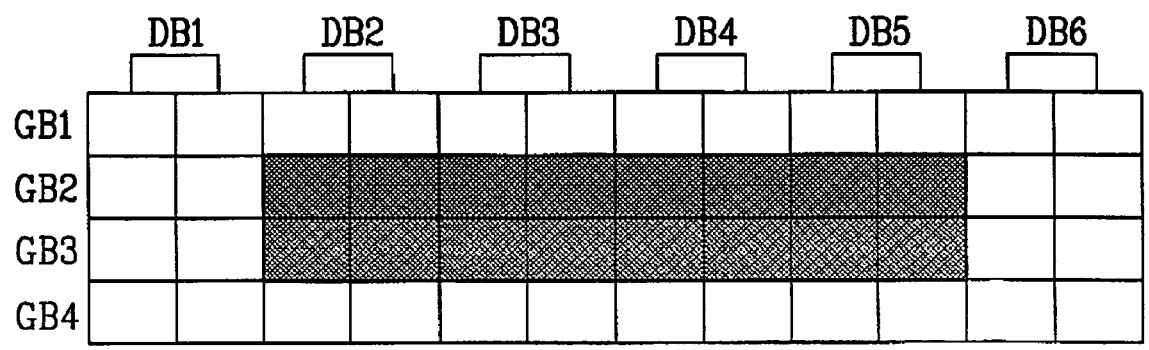
FIG. 14 illustrates images corresponding to one example of test pattern signals provided to the liquid crystal panel shown in FIG. 12.

According to the four scanning signals GB1 to GB4, test pattern images corresponding to the six test pattern signals DB1 to DB6 are displayed on the liquid crystal panel 112 as shown in FIG. 14.

Specifically, in a first period of a first frame, a first scanning signal GB1 is provided from the first gate connector block 172 to the test gate pads 107 of the first horizontal block. In synchronization with the first scanning signal GB1, six test pattern signals DB1 to DB6 corresponding to white images W are provided from the six data connector blocks 162 to the test data pads 103 of the six groups of two vertical blocks (i.e., the twelve vertical blocks). Here, the test pattern signals DB1 to DB6 provided to the test data pads 103 are identical. Accordingly, in the first period of the first frame, white test pattern images W corresponding to the six test pattern signals DB1 to DB6 are displayed on the first horizontal block of the liquid crystal panel 112 that receives the first scanning signal GB1.

In a second period of the first frame, a second scanning signal GB2 is provided from the second gate connector block 172 to the test gate pads 107 of the second horizontal block. In synchronization with the second scanning signal GB2, first and sixth test pattern signals DB1 and DB6 corresponding to white images W are provided from the first and sixth data connector blocks 162 to the test data pads 103 of the first, second, eleventh, and twelfth vertical blocks, while second to fifth test pattern signals DB2 to DB5 corresponding to black images B are provided from the second to fifth data connector blocks 162 to the test data pads 103 of the third to tenth vertical-blocks. Accordingly, in the second period of the first frame, white test pattern images W corresponding to the first and sixth test pattern signals DB1 and DB6 are displayed on first, second, eleventh, and twelfth vertical blocks in the second horizontal block that receives the second scanning signal GB2, and black test pattern images B corresponding to the second to fifth test pattern signals DB2 to DB5 are displayed on the other vertical blocks in the second horizontal block.

In a third period of the first frame, a third scanning signal GB3 is provided from the third gate connector block 172 to the test gate pads 107 of the third horizontal block. In synchronization with the third scanning signal GB3, six test pattern signals DB1 and DB6 corresponding to white images W are provided from the first and sixth data connector blocks 162 to the test data pads 103 of the first, second, eleventh, and twelfth vertical blocks, while second to fifth test pattern signals DB2 to DB5 corresponding to black images B are provided from the second to fifth data connector blocks 162 to the test data pads 103 of the third to tenth vertical blocks. Accordingly, in the third period of the first frame, white test pattern images W corresponding to the first and sixth test pattern signals DB1 and DB6 are displayed on first, second, eleventh, and twelfth vertical blocks in the third horizontal block that receives the third scanning signal GB3, and black test pattern images B corresponding to the second to fifth test pattern signals DB2 to DB5 are displayed on the other vertical blocks in the third horizontal block.

Finally, in a fourth period of the first frame, a fourth scanning signal GB4 is provided from the fourth gate connector block 172 to the test gate pads 107 of the fourth horizontal block. In synchronization with the fourth scanning signal GB4, six test pattern signals DB1 to DB6 corresponding to white images W are provided from the six data connector blocks 162 to the test data pads 103 of the six groups of two vertical blocks. Here, the test pattern signals DB1 to DB6 provided to the test data pads 103 are identical. Accordingly, in the fourth period of the first frame, white test pattern images W corresponding to the six test pattern signals DB1 to DB6 are displayed on the fourth horizontal block in the liquid crystal panel 112 that receives the fourth scanning signal GB4.

In the method and apparatus for testing an LCD according to the embodiment of the present invention, images corresponding to the test pattern signals from the (auto-probe) test apparatus are displayed on the liquid crystal panel 112 to examine if disconnections and point and line defects are present.

Figure 15:
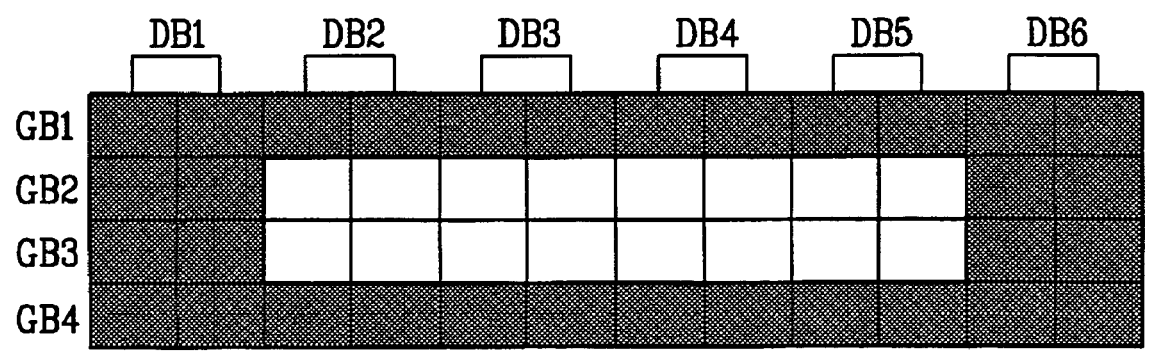
FIG. 15 illustrates images corresponding to another example of test pattern signals provided to the liquid crystal panel shown in FIG. 12.

FIG. 15 illustrates another example of the method and apparatus for testing an LCD according to an embodiment of the present invention. In this example, the controller 150 generates six test pattern signals DB1 to DB6 for displaying white test pattern images W on third to tenth vertical blocks in the second and third horizontal blocks of the liquid crystal panel (i.e., on the overlapping regions of the third to tenth vertical blocks and the second and third horizontal blocks) and displaying black test pattern images B on the other overlapping regions of the vertical and horizontal blocks.

Figure 16:
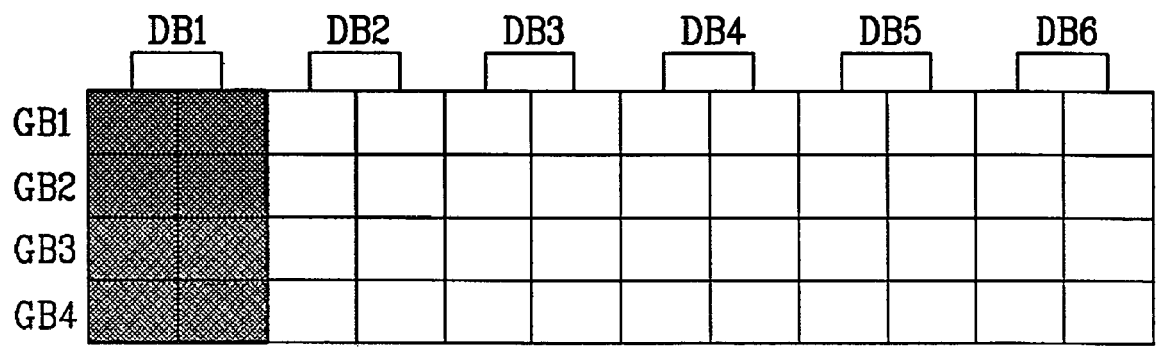
FIG. 16 illustrates images corresponding to another example of test pattern signals provided to the liquid crystal panel shown in FIG. 12.

FIG. 16 illustrates another example of the method and apparatus for testing an LCD according to the embodiment of the present invention. In this example, the controller 150 generates six test pattern signals DB1 to DB6 for displaying black test pattern images B on the first and second vertical blocks of the liquid crystal panel and displaying white test pattern images W on the other vertical blocks.

Figure 17:
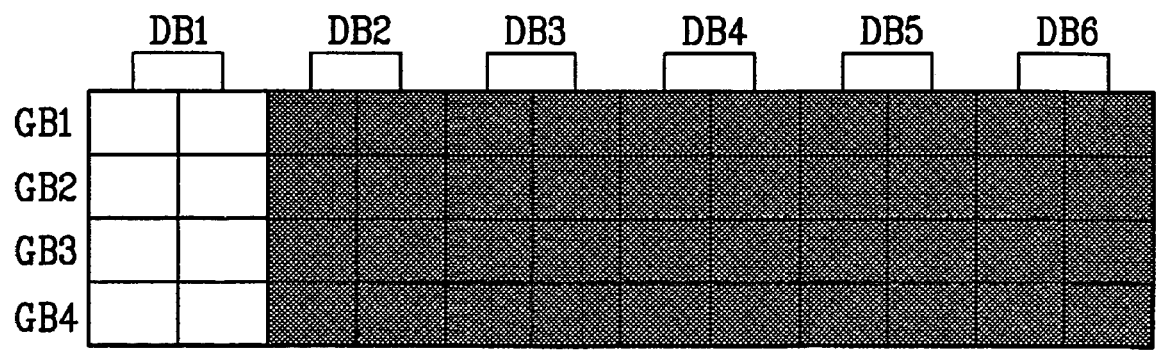
FIG. 17 illustrates images corresponding to another example of test pattern signals provided to the liquid crystal panel shown in FIG. 12.

FIG. 17 illustrates another example of the method and apparatus for testing an LCD according to the embodiment of the present invention. In this example, the controller 150 generates six test pattern signals DB1 to DB6 for displaying white test pattern images W on the first and second vertical blocks of the liquid crystal panel and displaying black test pattern images B on the other vertical blocks.

In the method and apparatus for testing an LCD according to the embodiment of the present invention, the liquid crystal panel is divided into a plurality of vertical blocks, and a common test pattern signal is provided to each group of at least two of the vertical blocks of the liquid crystal panel.

As is apparent from the above description, the present invention provides a method and apparatus for testing a liquid crystal display, wherein a liquid crystal panel is divided into a plurality of vertical blocks, and a common test pattern signal is provided to each group of at least two of the vertical blocks of the liquid crystal panel, thereby reducing the number of data connector pads (i.e., the number of channels) of a data probe unit and thus reducing the cost of the (auto-probe) test apparatus.

The present invention also provides a method and apparatus for testing a liquid crystal display, wherein a separate test pad portion is formed at a side of each pad portion of the liquid crystal panel, thereby preventing errors of alignment between data pads and data connector pads even when the pitch between data pads is decreased due to an increase in the resolution of the liquid crystal panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for testing a liquid crystal display, comprising:
   a stage on which a liquid crystal panel is placed;
   a plurality of vertical blocks, wherein each of the vertical blocks include a plurality of adjacent data lines;
   a data probe unit that includes a plurality of data connector blocks to provide test pattern signals respectively to groups of at least two of the plurality of vertical blocks of the liquid crystal panel;
   a plurality of horizontal blocks, wherein each of the horizontal blocks include a plurality of adjacent gate lines;
   a gate probe unit that provides scanning signals respectively to the plurality of horizontal blocks of the liquid crystal panel; and
   a controller that provides test pattern signals to the data probe unit and provides scanning signals to the gate probe unit;
   wherein the controller generates a plurality of test pattern signals that display white test pattern images on overlapping regions of specific ones of the vertical and horizontal blocks of the liquid crystal panel and display black test pattern images on the other overlapping regions of the vertical and horizontal blocks of the liquid crystal panel and provides the plurality of test pattern signals to the data connector blocks through a plurality of test signal transmission lines.

2. The apparatus according to claim 1, wherein each of the data connector blocks provides a test pattern signal to a corresponding group of two of the plurality of vertical blocks of the liquid crystal panel, and
   each of the data connector blocks includes:
   a first data connector pad portion including a plurality of first data connector pads that provide the test pattern signal to a first vertical block of the corresponding group of two vertical blocks; and
   a second data connector pad portion including a plurality of second data connector pads that provide the test pattern signal to a second vertical block of the corresponding group of two vertical blocks.

3. The apparatus according to claim 2, wherein the plurality of first data connector pads and the plurality of second data connector pads are commonly connected to a single test signal transmission line.

4. The apparatus according to claim 2, wherein the liquid crystal panel includes:
   a plurality of data pads on each of the vertical blocks of the liquid crystal panel;

a plurality of test data pads on at least one side of each of the vertical blocks;

a plurality of dummy common data lines through which each group of one or more of the plurality of data pads are commonly connected to the plurality of test data pads;

a plurality of gate pads on each of the horizontal blocks of the liquid crystal panel;

a plurality of test gate pads on at least one side of each of the horizontal blocks; and a plurality of dummy common gate lines through which each group of one or more of the plurality of gate pads are commonly connected to the plurality of test gate pads.

5. The apparatus according to claim 4, wherein the number and shape of the plurality of first data connector pads and the number and shape of the plurality of second data connector pads are each the same as the number and shape of the plurality of test data pads.

6. The apparatus according to claim 4, wherein the size of the data connector pads is greater than the size of the data pads.

* * * * *